(12) United States Patent
Götz et al.

(10) Patent No.: US 7,775,927 B2
(45) Date of Patent: Aug. 17, 2010

(54) TRACTION DRIVE OF A MACHINE WITH AN INTERCHANGEABLE TRANSMISSION MODULE

(75) Inventors: Bernhard Götz, Aschaffenburg (DE); Bernward Welschof, Großostheim (DE)

(73) Assignee: Linde Material Handling GmbH, Aschaffenburg (DE)

( * ) Notice: Subject to any disclaimer, the term of this patent is extended or adjusted under 35 U.S.C. 154(b) by 585 days.

(21) Appl. No.: 11/800,710

(22) Filed: May 7, 2007

(65) Prior Publication Data

US 2007/0270263 A1 Nov. 22, 2007

(30) Foreign Application Priority Data

May 12, 2006 (DE) .................. 10 2006 022 203

(51) Int. Cl.
*B60K 17/10* (2006.01)
*B60K 17/12* (2006.01)
(52) U.S. Cl. ..................................... 475/206
(58) Field of Classification Search ............... 475/1, 475/72, 83, 150, 161
See application file for complete search history.

(56) References Cited

U.S. PATENT DOCUMENTS 6,644,004 B2 * 11/2003 Reimers et al. ............... 56/14.7
6,742,619 B2 * 6/2004 Farbotnik et al. ............ 180/312
7,407,458 B2 * 8/2008 Hoff ............................ 475/150
2005/0279545 A1 * 12/2005 Matsuda ..................... 180/65.2
2006/0158024 A1 * 7/2006 Wendl ......................... 301/137
2006/0211535 A1 * 9/2006 Casey ............................ 477/3

FOREIGN PATENT DOCUMENTS

DE          100 25 089 A1    11/2001

* cited by examiner

*Primary Examiner*—Sherry L Estremsky
*Assistant Examiner*—Edwin A. Young
(74) *Attorney, Agent, or Firm*—The Webb Law Firm

(57) ABSTRACT

A traction drive of a machine has an internal combustion engine, a transmission module located downstream of the engine and having an adjustable output speed, and a drive axle with a differential transmission, having a mechanical drive connection with the transmission module. The transmission module is a removable, replaceable, and interchangeable transmission module (3) which can be selected from a plurality of transmission modules (3) having different transmission types, each with a standardized input interface and a standardized output interface. A first transmission module (3) can be a hydrostatic compact transmission having a hydraulic pump (5) with an adjustable hydraulic delivery volume, and a hydraulic motor (6) in a functional hydraulic connection with the pump (5). A second transmission module (3) can be an electric compact transmission having a generator (7) and an electric motor (8) in a functional electrical connection with it.

17 Claims, 3 Drawing Sheets

TRACTION DRIVE OF A MACHINE WITH AN INTERCHANGEABLE TRANSMISSION MODULE

This application claims priority to German Application No. 10 2006 022 203.2, filed May 12, 2006, which application is herein incorporated by reference in its entirety.

BACKGROUND OF THE INVENTION

1. Field of the Invention

This invention relates to a traction drive of a machine, in particular of an industrial truck, which has an internal combustion engine, a transmission module located downstream of the engine with an adjustable output speed, and a drive axle with a differential transmission which is in a mechanical drive connection with the transmission module.

2. Technical Considerations

DE 100 25 089 A1 describes a generic traction drive. On this traction drive, a continuously variable electric transmission is provided which has a generator and an electric motor connected to it. The generator and electric motor are interlocked with each other or are located in a common housing and therefore form a transmission module which on continuously variable transmissions of this type is also called a compact transmission. In contrast, a continuously variable transmission in which the principal components are separate from each other is called a "distributed transmission construction".

In general, the type of traction drive used is essential in determining the construction, traction, and working capabilities of machines, in particular of industrial trucks (e.g., fork lift trucks). Industrial trucks with a traction drive that contain an electro-converter can of course have a traction capability which is similar to that of industrial trucks that are provided with a hydrostatic traction drive. Although, they can differ in terms of their construction, such as with regard to the location of the internal combustion engine, the realization of the drive axle, etc. For example, on the latter type of industrial truck, hydrostatic wheel motors are frequently used as the output-side components of the hydrostatic drive system, which in distributed transmission constructions are connected to a pump of the hydrostatic drive system. The pump is connected with the internal combustion engine.

In traction operation, industrial trucks with hydrodynamic converters and power shift transmissions differ from the construction described above with regard to their design, their traction, and work response. Compared to such industrial trucks, industrial trucks with a continuously variable transmission (e.g., electro-converter or hydrostatic drive system) frequently have advantages in terms of ease of traction operation.

Depending on the concept used in the design of the traction drive, different types of industrial trucks must therefore be developed and manufactured, which requires a significant investment of time, effort, and money.

Therefore, it is an object of this invention to provide a traction drive of the general type described above but that has an expanded range of operation.

SUMMARY OF THE INVENTION

The invention teaches that the transmission module comprises a removable, replaceable, and/or interchangeable transmission module of the traction drive, which can be selected from a plurality of transmission modules that employ different transmission concepts. Each transmission module can be provided with a standardized input and a standardized output interface. For example, a first transmission module can be realized in the form of a hydrostatic compact transmission which has a hydraulic pump with an adjustable delivery volume and is thus in a hydraulically active connection with the hydraulic motor. A second transmission module can be realized in the form of an electric compact transmission which has a generator and an electric motor that is in a functional electric connection with it.

A teaching of the invention is that the traction drive is therefore realized so that its module that is essential for the traction and working response and for the vehicle construction of the machine, namely the transmission unit, can be removed and replaced. A specific transmission model can be used depending on the individual application. The machine itself (such as an industrial truck) can therefore remain essentially unchanged. In spite of the different types of drives it thereby becomes possible, on a machine that is realized in the form of a counterweighted fork lift truck, for example, to develop and manufacture a single vehicle model. Regardless of whether a hydrostatic or electric compact transmission is installed in the traction drive, the same functions of the fork lift truck can be achieved. The drive concept is invisible to the operator.

The concentration of technically complex components in a transmission module in a small space also makes the equipment easier to service than when such components are distributed throughout the vehicle.

If, as in one advantageous configuration of the invention, the hydrostatic compact transmission has a hydraulic motor that is realized in the form of a low-speed engine, the downstream drive axle requires no reducing gear.

In one development of the invention, the hydraulic motor of the hydrostatic compact transmission is connected coaxially to the hydraulic pump. The result is a slim and space-saving in-line construction.

An additional and also advantageous construction can be achieved by orienting the hydraulic motor of the hydrostatic compact transmission parallel to the hydraulic pump. In this case it is particularly advantageous if a drive shaft of the hydraulic pump of the hydrostatic compact transmission is coupled with a hydraulic booster pump of a hydraulic work and/or steering system.

For adaptation to the naturally higher speed level of an electric motor, the electric compact transmission can contain a reduction gear that is located downstream of the electric motor. Likewise, it is also possible to locate the reduction gear in any other suitable location, for example directly on the input of the differential transmission.

Analogous to the above mentioned in-line arrangement of the hydraulic pump and hydraulic motor of the hydrostatic transmission, the electric motor of the electric compact transmission can be connected coaxially to the generator. In this case, however, it is also possible for the electric motor of the compact transmission to be oriented parallel to the generator.

In the case described immediately above, a drive shaft of the generator of the electric compact transmission can be coupled with a hydraulic booster pump of a hydraulic drive and/or steering system.

In one particularly favorable development of the invention, the electric compact transmission can be operated at an operating voltage of more than 100 Volts, and in particular at an operating voltage of more than 200 Volts, preferably 300 to 500 Volts. It thereby becomes possible to achieve a power density of the electric components of the electric compact transmission that compares favorably to the power density of the hydraulic components of a hydrostatic compact transmission that works at a maximum operating pressure of approximately 400 bar.

The encapsulated arrangement of electric components inside the electric compact transmission has thereby been found to be advantageous in terms of short current paths (low losses) and simple shielding (good insulation and electromagnetic compatibility).

In this context, it is also advantageous if the electric compact transmission and/or its power modules are fluid-cooled. The cooling fluid can thereby be the hydraulic fluid of a hydraulic work and/or steering system so that the fluid circuit that is already present can also be used to cool the electrical components.

If an electric energy storage mechanism is in an electrical connection with the electric compact transmission, energy can be recovered during braking operation and downhill travel and stored. Operation is also possible when the internal combustion engine is turned off.

BRIEF DESCRIPTION OF THE DRAWINGS

Additional advantages and details of the invention are explained in greater detail below on the basis of the exemplary embodiments illustrated in the accompanying schematic figures, in which.

DESCRIPTION OF THE PREFERRED EMBODIMENTS

Figure 1:
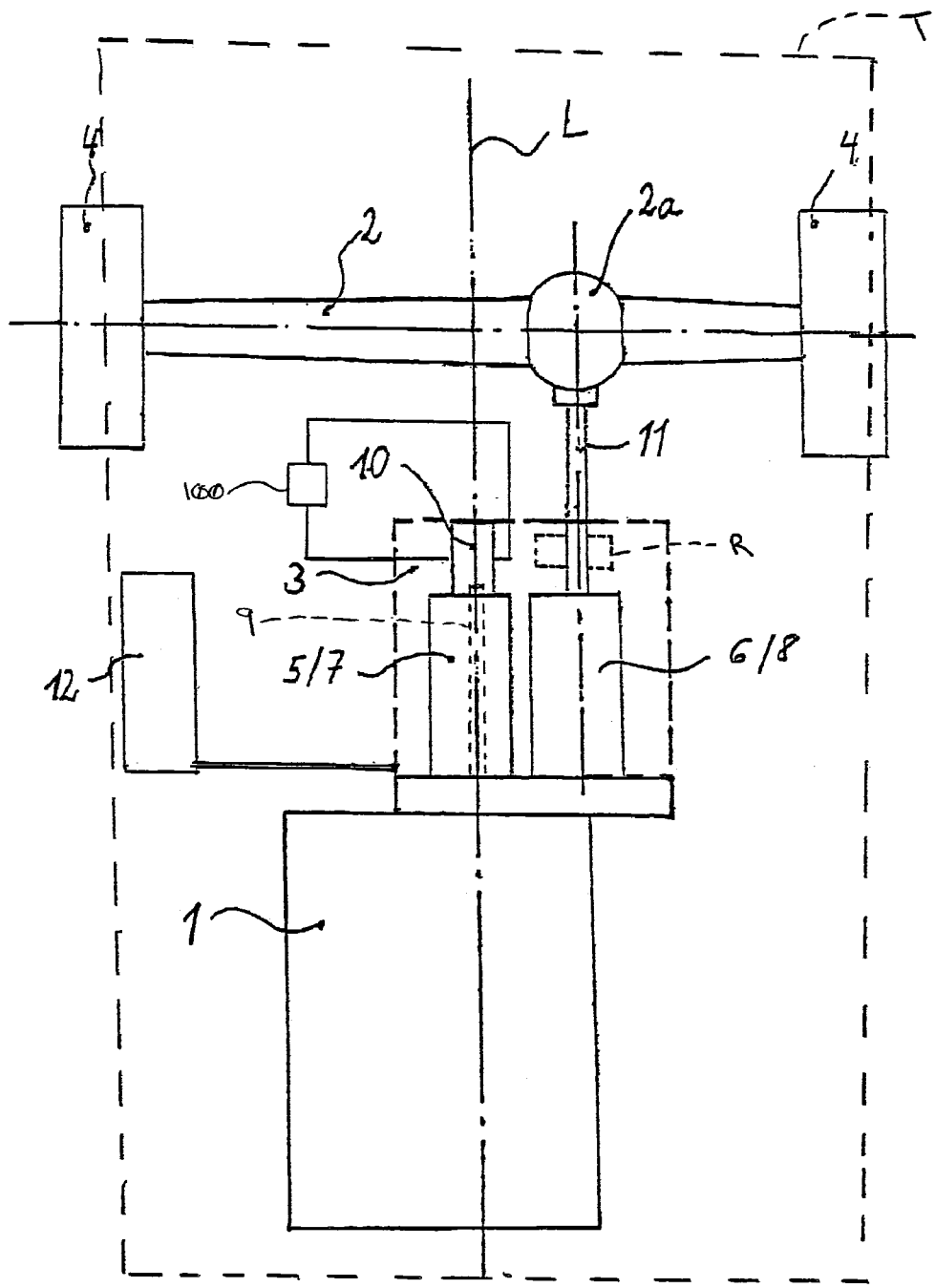
FIG. 1 is a schematic drawing of a traction drive incorporating features of the invention.

As shown in FIG. 1, a traction drive of the invention is provided for a machine, such as for an industrial truck T (for example a counterweighted fork lift truck), and has an internal combustion engine 1, a drive axle 2, and a transmission module 3 which is located between the internal combustion engine 1 and the drive axle 2. The output speed of the transmission module 3 is adjustable. The drive axle 2 is realized in the form of a differential axle, and therefore has a differential transmission 2a on the input side and drives two wheels 4.

The transmission module 3 is designed as a removable, replaceable, and interchangeable transmission module. In this case, a transmission module suitable for use in the traction drive can be selected from a plurality of available transmission modules 3, as appropriate to the specific application. All the transmission modules 3 have a standardized input interface with the internal combustion engine 1 and a standardized output interface with the drive axle 2, and preferably have the same or largely the same dimensions, although they work according to different operating principles.

For example, a first transmission module 3 that can be used, depending on the specific application, can include a hydrostatic compact transmission which has a hydraulic pump 5 that is coupled with the internal combustion engine 1. The hydraulic delivery volume of the pump 5 can be adjustable and the pump 5 can be hydraulically connected (for example via a closed circuit) to a hydraulic motor 6. The intake volume of the hydraulic motor 6 can be constant or adjustable. An exemplary hydrostatic compact transmission of this type, into which the valves necessary for control can also be integrated, can be operated at a maximum operating pressure of more than 400 bar. As a result of which, a high power density can be achieved. The operation with hydrostatic hydraulic fluid means that a liquid cooling system is already present.

A second transmission module 3 which can be installed in the traction drive in place of the first transmission module 3 can be in the form of an electrical compact transmission and has a generator 7 that is driven by the internal combustion engine 1 and feeds an electric motor 8.

The power modules that are necessary for the control and regulation of the generator 7 and/or of the electric motor 8 can also be advantageously integrated into the compact transmission, e.g., by means of a flange mounting. In one non-limiting embodiment, the electric compact transmission can be operated at an operating voltage of more than 100 Volts, and in particular more than 200 Volts. At an operating voltage of 400 Volts, for example, a power density can be achieved that is approximately equal to the power density of a hydrostatic compact transmission. To prevent overheating, the electric compact transmission is preferably fluid cooled.

Figure 2:
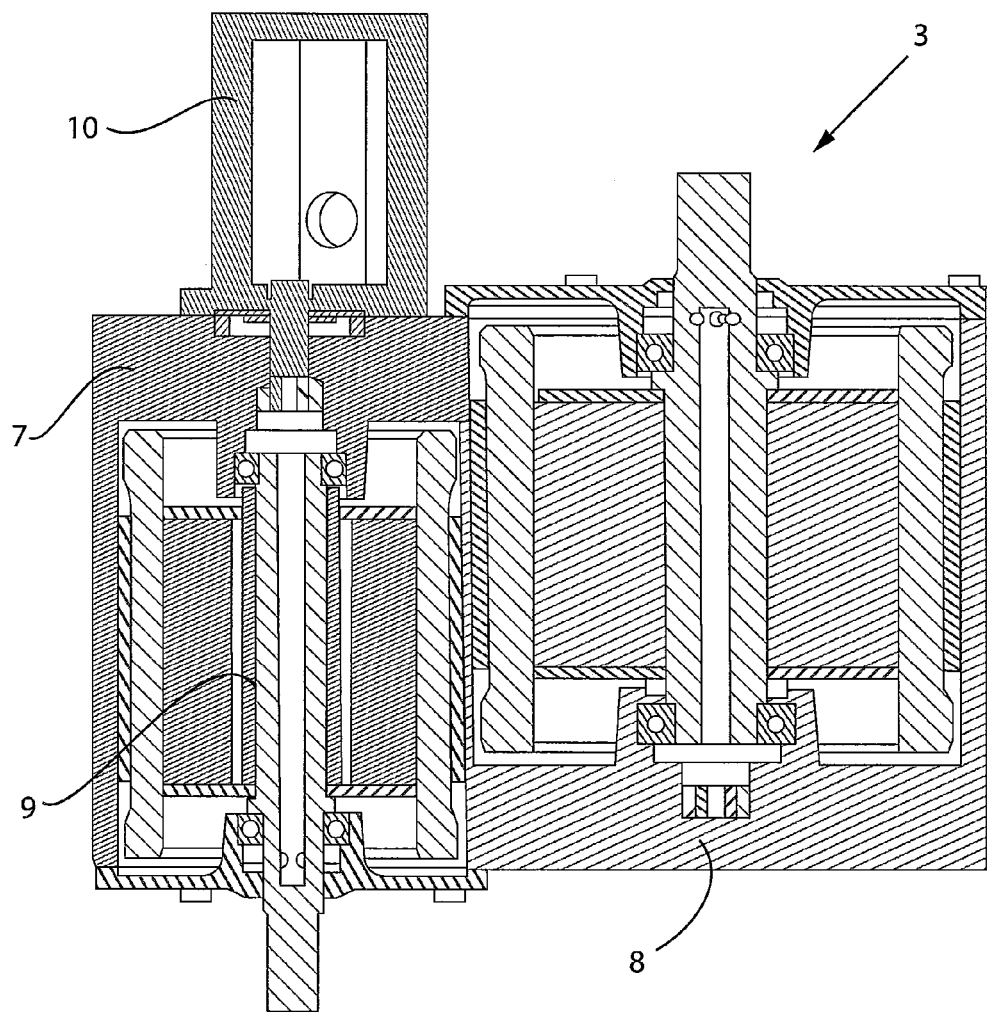
FIG. 2 is a section through an electric compact transmission of the traction drive illustrated in FIG. 1.

In the construction of the traction drive of the invention illustrated in FIGS. 1 and 2, in the case of the hydrostatic compact transmission, the hydraulic motor 6 is oriented parallel to the hydraulic pump 5, and in the case of the electric compact transmission the electric motor 8 is oriented parallel to the generator 7. A direct power transfer is thereby possible to the hydraulic pump 5 or to the generator 7, so that a hydraulic booster pump 10 of a hydraulic work and/or steering system 100 of the machine can also be driven by the internal combustion engine 1 by means of a drive shaft 9 of the hydraulic pump 5 or of the generator 7.

Figure 3:
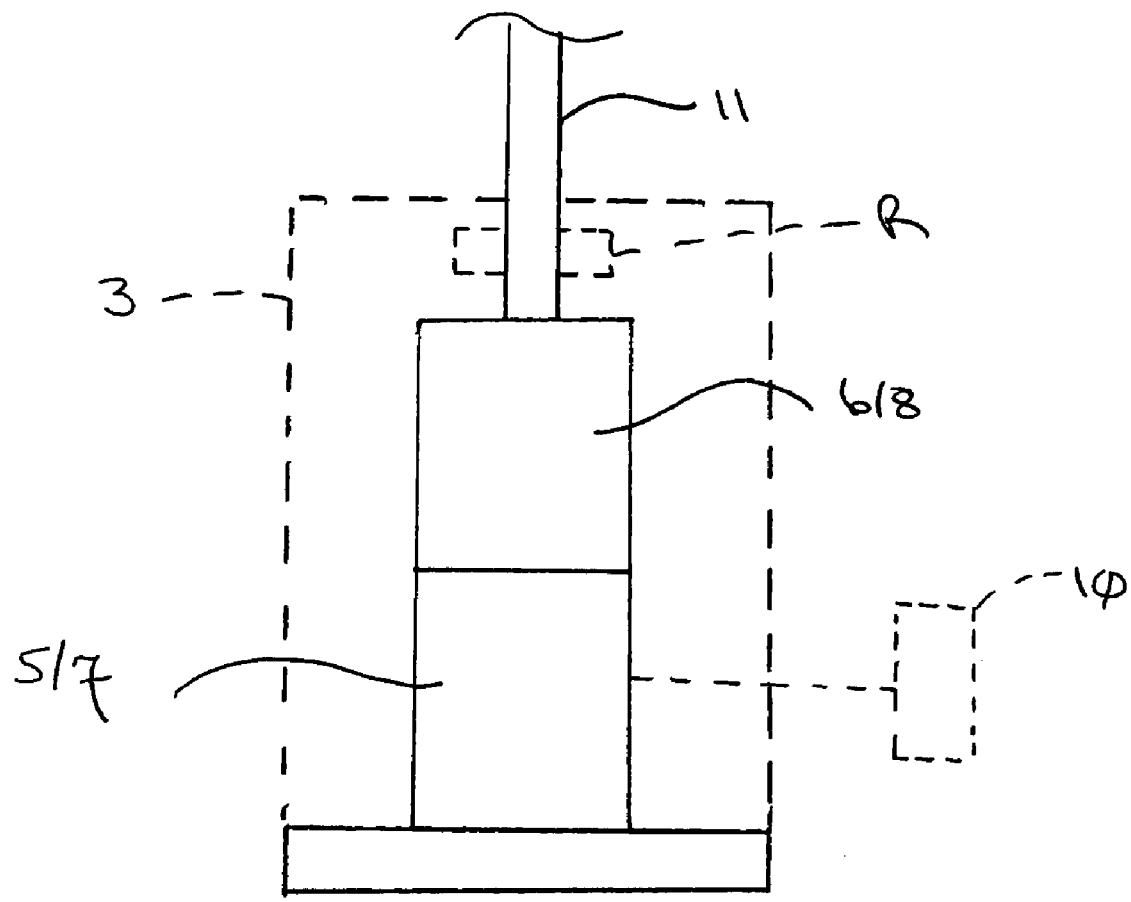
FIG. 3 is a schematic drawing of a portion of another traction drive incorporating features of the invention.

Of course, as shown in FIG. 3, an in-line arrangement of the hydraulic pump 5 and of the hydraulic motor 6 or of the generator 7 and the electric motor 8 is possible, if these components are arranged coaxially one behind another. In that case, the direct power transfer capability to the booster pump 10 can be omitted. In this case, therefore, the booster pump 10 can be driven in some other manner, and can be oriented parallel to the transmission module 3, for example.

The above mentioned fluid cooling of the electric compact transmission can be achieved by the hydraulic fluid of the booster pump 10, whereby the hydraulic fluid circuit of the hydraulic work and/or steering system that is already present is used for a dual purpose, which keeps the effort and cost involved in the construction low.

In the illustrated exemplary embodiment, the internal combustion engine 1 and the hydraulic pump 5 or the generator 7 are oriented coaxially with a longitudinal center axis L of the machine. The differential transmission 2a of the drive axle 2 is located eccentrically on account of the construction with parallel principal components, and can be connected with the output of the transmission module 3 by an intermediate shaft 11, for example.

When the electric compact transmission is used as the transmission module 3, it is preferably connected to an electric energy storage mechanism 12, so that kinetic energy can be recovered during braking or during downhill travel and stored in the energy storage mechanism 12. The electric energy storage mechanism 12 can be realized in the form of a rechargeable battery. When the battery is sufficiently charged, operation with the internal combustion engine 1 turned off is also possible.

The input interface of each transmission module 3 is always located between the internal combustion engine 1 and the transmission module 3. The output interface can be located, for example, directly on the output of the hydraulic motor 6 or of the electric motor 8.

It is also possible, however, to provide the output interface in the vicinity of the intermediate shaft 11 or between the intermediate shaft 11 and the differential transmission 2a, i.e., on the drive axle 2. In the latter case, the intermediate shaft 11 then represents an output-side component of the transmission module 3, which can easily have the function of an adapter and equalize differences in the distance between the different transmission modules 3 and the differential transmission 2a.

For the naturally higher speed level of an electric motor 8, the electric compact transmission module 3 can contain a reduction gear R located downstream of the electric motor 8. Likewise, it is also possible to locate the reduction gear R in any other suitable location, for example, directly on the input of the differential transmission 2a.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. An industrial truck having interchangeable transmission modules, comprising:
   an internal combustion engine;
   an interchangeable transmission module located downstream of the engine and having an adjustable output speed; and
   a drive axle with a differential transmission in a mechanical drive connection with the transmission module,
   wherein the transmission module is a selectively interchangeable transmission module of a traction drive selected from the group consisting of a first transmission module comprising a hydrostatic compact transmission having a hydraulic pump with an adjustable hydraulic delivery volume and a hydraulic motor that is in a functional hydraulic connection with the pump, and a second transmission module comprising an electric compact transmission having a generator and an electric motor that is in a functional electrical connection with the generator and wherein each transmission module has a standardized input interface configured to engage the internal combustion engine and a standardized output interface configured to engage the drive axle such that either the first transmission module or the second transmission module can be selectively installed as a unit depending upon a desired use of the industrial truck.

2. The industrial truck of claim 1, wherein the hydraulic motor of the hydrostatic compact transmission is connected coaxially to the hydraulic pump.

3. The industrial truck of claim 2, wherein a drive shaft of the hydraulic pump of the hydrostatic compact transmission is coupled with a hydraulic booster pump of a hydraulic work system or a steering system.

4. The industrial truck of claim 1, wherein the hydraulic motor of the hydrostatic compact transmission is oriented parallel to the hydraulic pump.

5. The industrial truck of claim 4, wherein a drive shaft of the hydraulic pump of the hydrostatic compact transmission is coupled with a hydraulic booster pump of a hydraulic work system or a steering system.

6. The industrial truck of claim 1, wherein the electric compact transmission includes a reduction gear that is connected downstream of the electric motor.

7. The industrial truck of claim 1, wherein the electric motor of the electric compact transmission is oriented coaxially with the generator.

8. The industrial truck of claim 7, wherein a drive shaft of the generator of the electric compact transmission is coupled with a hydraulic booster pump of a hydraulic work system or a steering system.

9. The industrial truck of claim 7, wherein an electric energy storage mechanism is electrically connected with the electric compact transmission.

10. The industrial truck of claim 1, wherein the electric motor of the electric compact transmission is oriented parallel to the generator.

11. The industrial truck of claim 10, wherein a drive shaft of the generator of the electric compact transmission is coupled with a hydraulic booster pump of a hydraulic work system or a steering system.

12. The industrial truck of claim 10, wherein an electric energy storage mechanism is electrically connected with the electric compact transmission.

13. The industrial truck of claim 1, wherein the electric compact transmission is operated at an operating voltage of more than 100 Volts.

14. The industrial truck of claim 13, wherein the operating voltage is more than 200 Volts.

15. The industrial truck of claim 13, wherein the operating voltage is in the range of 300 Volts to 500 Volts.

16. The industrial truck of claim 1, wherein the electric compact transmission is fluid cooled.

17. The industrial truck of claim 1, wherein an electric energy storage mechanism is electrically connected with the electric compact transmission.

* * * * *